United States Patent [19]
Kalagian

[11] Patent Number: 5,822,909
[45] Date of Patent: Oct. 20, 1998

[54] FISHING LURE WITH ILLUMINATING EYES

[76] Inventor: Curt A. Kalagian, 175 Alverson Rd., Mobile, Ala. 36608

[21] Appl. No.: 746,170

[22] Filed: Nov. 7, 1996

[51] Int. Cl.$^6$ ............................................. A01K 85/00
[52] U.S. Cl. ............................................. 43/17.6
[58] Field of Search ............................. 43/17.6

[56] References Cited

U.S. PATENT DOCUMENTS

| | | | |
|---|---|---|---|
| 2,754,610 | 7/1956 | Carlson | 43/17.6 |
| 3,608,228 | 9/1971 | Borresen | 43/17.6 |
| 3,621,600 | 11/1971 | Dworski | 43/17.6 |
| 3,828,177 | 8/1974 | Day | 43/17.6 |
| 3,969,839 | 7/1976 | Ziegler | 43/17.6 |
| 4,458,439 | 7/1984 | Garrett | 43/17.6 |
| 4,663,880 | 5/1987 | Grobl | 43/17.6 |
| 4,763,433 | 8/1988 | Kulak | 43/17.6 |
| 4,799,327 | 1/1989 | Treon | 43/17.6 |
| 4,811,513 | 3/1989 | Grobl | 43/17.6 |
| 5,299,107 | 3/1994 | Ratcliffe | 43/17.6 |
| 5,461,815 | 10/1995 | Rodgers | 43/17.6 |

*Primary Examiner*—Kurt Rowan

[57] ABSTRACT

A fishing lure with illuminating eyes including a head portion having a pair of LED's secured thereto. The head portion has a chamber formed therein. The chamber has a battery disposed therein. The battery has an electrical contact on an outer surface thereof. The battery has wiring coupled with the pair of LED's. A tail portion couples to the head portion. The tail portion has an electrical contact disposed on a free end thereof. The electrical contact selectively engages the electrical contact of the battery for illumination of the pair of LED's.

1 Claim, 2 Drawing Sheets

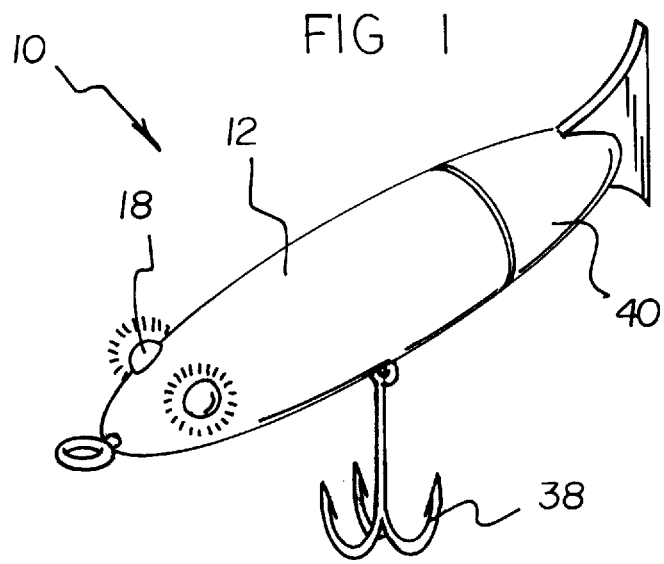
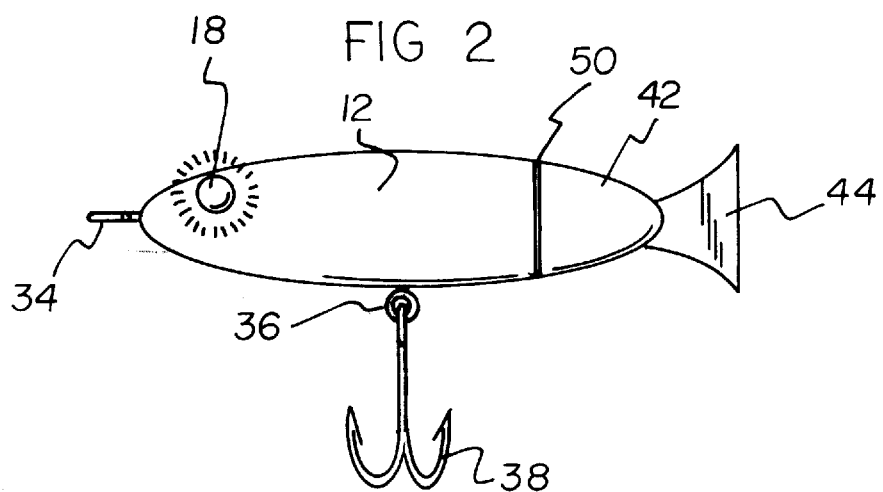

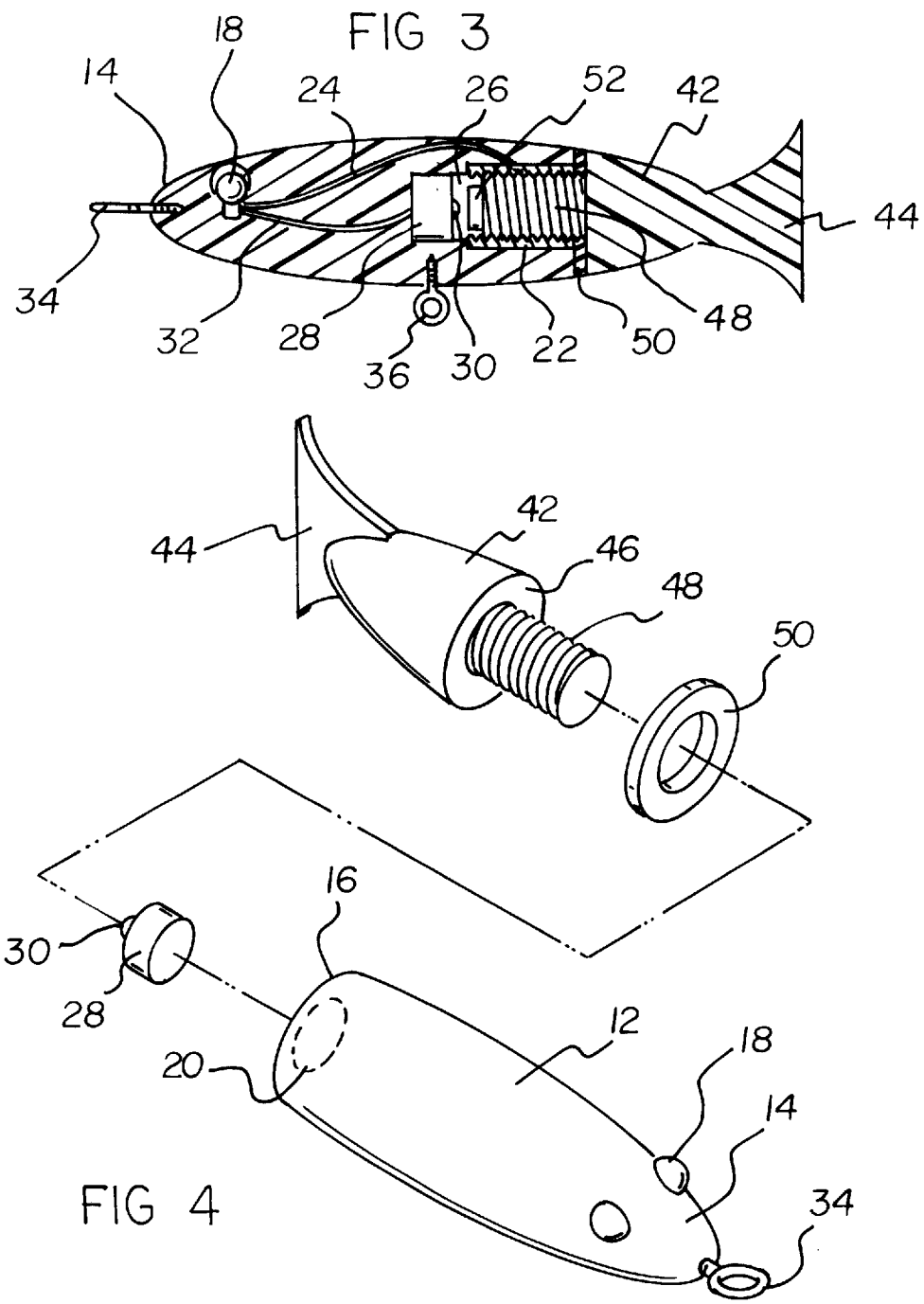

FISHING LURE WITH ILLUMINATING EYES

BACKGROUND OF THE INVENTION

1. Field of the Invention

The present invention relates to a fishing lure with illuminating eyes and more particularly pertains to improving visibility of the lure for attracting various varieties of fish with a fishing lure with illuminating eyes.

2. Description of the Prior Art

The use of fishing lures is known in the prior art. More specifically, fishing lures heretofore devised and utilized for the purpose of including sources of illumination are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,175,951 to Fruchey discloses an illuminated fishing lure.

U.S. Pat. No. 5,330,282 to Rodgers discloses a fishing lure.

U.S. Pat. No. 5,392,555 to Tingey discloses an illuminated fishing lure apparatus.

U.S. Pat. No. 5,461,815 to Rodgers discloses a fishing lure.

While these devices fulfill their respective, particular objective and requirements, the aforementioned patents do not describe a fishing lure with illuminating eyes for improving visibility of the lure for attracting various varieties of fish.

In this respect, the fishing lure with illuminating eyes according to the present invention substantially departs from the conventional concepts and designs of the prior art, and in doing so provides an apparatus primarily developed for the purpose of improving visibility of the lure for attracting various varieties of fish.

Therefore, it can be appreciated that there exists a continuing need for new and improved fishing lure with illuminating eyes which can be used for improving visibility of the lure for attracting various varieties of fish. In this regard, the present invention substantially fulfills this need.

SUMMARY OF THE INVENTION

In the view of the foregoing disadvantages inherent in the known types of fishing lures now present in the prior art, the present invention provides an improved fishing lure with illuminating eyes. As such, the general purpose of the present invention, which will be described subsequently in greater detail, is to provide a new and improved fishing lure with illuminating eyes and method which has all the advantages of the prior art and none of the disadvantages.

To attain this, the present invention essentially comprises a head portion having a generally cylindrical configuration. The head portion has an arcuate first end and a planar second end. The head portion has a pair of LED's secured thereto inwardly of the arcuate first end. The planar second end has a threaded recess extending inwardly thereof. The threaded recess has a metallic insert disposed therein. The metallic insert has wiring extending therefrom to couple with the pair of LED's. The head portion has a chamber formed therein inwardly of the threaded recess. The chamber has a battery disposed therein. The battery has an electrical contact on an outer surface thereof. The battery has wiring coupled with the pair of LED's. The head portion has a first eyelet secured to the arcuate first end and extends essentially in a collinear relationship therewith. The head portion has a second eyelet extending downwardly from an intermediate portion thereof. The device includes a tail portion comprised of a generally cylindrical body and a tail. The body has a planar interior end. A threaded rod extends inwardly from the planar interior end. The threaded rod has a rubber gasket removably coupled thereto. The threaded rod engages the threaded recess for coupling of the tail portion to the head portion. The threaded rod has an electrical contact disposed on a free end thereof. The electrical contact selectively engages the electrical contact of the battery for illumination of the pair of LED's.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fishing lure with illuminating eyes which has all the advantages of the prior art fishing lures and none of the disadvantages.

It is another object of the present invention to provide a new and improved fishing lure with illuminating eyes which may be easily and efficiently manufactured and marketed.

It is a further object of the present invention to provide a new and improved fishing lure with illuminating eyes which is of durable and reliable construction.

An even further object of the present invention is to provide a new and improved fishing lure with illuminating eyes which is susceptible of a low cost of manufacture with regard to both materials and labor, and which accordingly is then susceptible of low prices of sale to the consuming public, thereby making such a fishing lure with illuminating eyes economically available to the buying public.

Even still another object of the present invention is to provide a new and improved fishing lure with illuminating eyes for improving visibility of the lure for attracting various varieties of fish.

Lastly, it is an object of the present invention to provide a new and improved fishing lure with illuminating eyes including a head portion having a pair of LED's secured thereto. The head portion has a chamber formed therein. The chamber has a battery disposed therein. The battery has an electrical contact on an outer surface thereof. The battery has wiring coupled with the pair of LED's. A tail portion couples to the head portion. The tail portion has an electrical contact disposed on a free end thereof. The electrical contact selectively engages the electrical contact of the battery for illumination of the pair of LED's.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the fishing lure with illuminating eyes constructed in accordance with the principles of the present invention.

FIG. 2 is a side elevation view of the present invention.

FIG. 3 is a cross-sectional side view of the present invention.

FIG. 4 is an exploded perspective view of the present invention.

The same reference numerals refer to the same parts through the various Figures.

DESCRIPTION OF THE PREFERRED EMBODIMENT

With reference now to the drawings, and in particular, to FIGS. 1 through 4 thereof, the preferred embodiment of the new and improved fishing lure with illuminating eyes embodying the principles and concepts of the present invention and generally designated by the reference number 10 will be described.

Specifically, it will be noted in the various Figures that the device relates to a fishing lure with illuminating eyes for improving visibility of the lure for attracting various varieties of fish. In its broadest context, the device consists of a head portion and a tail portion. Such components are individually configured and correlated with respect to each other so as to attain the desired objective.

The device 10 includes a head portion 12 having a generally cylindrical configuration. The head portion 12 has an arcuate first end 14 and a planar second end 16. The head portion 12 has a pair of LED's 18 secured thereto inwardly of the arcuate first end 14. The LED's 18 are positioned on the head portion 12 in place of eyes. The planar second end 16 has a threaded recess 20 extending inwardly thereof. The threaded recess 20 has a metallic insert 22 disposed therein. The metallic insert 22 has wiring 24 extending therefrom to couple with the pair of LED's 18. The head portion 12 has a chamber 26 formed therein inwardly of the threaded recess 20. The chamber 26 has a battery 28 disposed therein. The battery 28 has an electrical contact 30 on an outer surface thereof. The battery 28 has wiring 32 coupled with the pair of LED's 18. The head portion 12 has a first eyelet 34 secured to the arcuate first end 14 and extends essentially in a collinear relationship therewith. The first eyelet 34 is used for coupling with a fishing line. The head portion 12 has a second eyelet 36 extending downwardly from an intermediate portion thereof. The second eyelet 36 is used for coupling with a hook 38.

The device 10 includes a tail portion 40 comprised of a generally cylindrical body 42 and a planar tail with arcuate side edges 44. The body 42 has a planar interior end 46. A threaded rod 48 extends inwardly from the planar interior end 46. The threaded rod 48 has a rubber gasket 50 removably coupled thereto. The threaded rod 48 engages the metallic insert 22 for coupling of the tail portion 40 to the head portion 12. The threaded rod 48 has an electrical contact 52 disposed on a free end thereof. The electrical contact 52 selectively engages the electrical contact 30 of the battery 28 for illumination of the pair of LED's 18.

The device 10 can be produced in a variety of different shapes and styles resembling aquatic lures such as frogs, worms, crawdads, minnows, and other similar fish, and would be separated into two threaded sections (head portion 12 and tail portion 40) made from casted acrylic or another suitable material.

In use, a fisherman would thread his/her line through the first eyelet 34 and then twist the tail portion 40 tightly into the head portion 12. This would move the threaded rod 48 forward towards the chamber 26 and the battery 28 to cause the electrical contacts 30,52 to abut and complete the electrical connection to illuminate the pair of LED's. The rubber gasket 50 will keep the interior of the device 10 watertight while in use.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A fishing lure with illuminating eyes for improving visibility of the lure for attracting various varieties of fish comprising, in combination:

a head portion formed of casted acrylic material having a generally cylindrical configuration, the head portion having an arcuate first end and a planar second end, the head portion having a pair of LED's secured thereto inwardly of the arcuate first end and extending therefrom for defining eyes, the planar second end having a recess extending inwardly thereof, the recess having a threaded metallic insert disposed therein, the metallic insert having wiring 24 extending therefrom to couple with the pair of LED's, the head portion having a chamber formed therein inwardly of the recess, the chamber having a battery disposed therein, the battery having an electrical contact on an outer surface thereof, the battery having wiring coupled with the pair of LED's, the head portion having a first eyelet 34 secured to the arcuate first end and extending essentially in a collinear relationship therewith, the head portion having a second eyelet 36 extending downwardly from an intermediate portion thereof; and a tail portion formed of casted acrylic material and comprised of a body and a thin planar tail with arcuate side edges, the body having a planar interior end 46, a threaded rod 48 extending from the planar interior end, the threaded rod having a rubber gasket 50 removably coupled thereto, the threaded rod engaging the threaded metallic insert for coupling of the tail portion to the head portion, the threaded rod having an electrical contact 52 disposed on a free end thereof, the electrical contact selectively engaging the electrical contact of the battery for illumination of the pair of LED's.

\* \* \* \* \*